(12) United States Patent
Shah

(10) Patent No.: US 11,197,226 B2
(45) Date of Patent: Dec. 7, 2021

(54) LOW POWER COMMUNICATIONS SYSTEM

(71) Applicant: Rohan Shah, Exton, PA (US)

(72) Inventor: Rohan Shah, Exton, PA (US)

( * ) Notice: Subject to any disclaimer, the term of this patent is extended or adjusted under 35 U.S.C. 154(b) by 0 days.

(21) Appl. No.: 16/921,511

(22) Filed: Jul. 6, 2020

(65) Prior Publication Data

US 2020/0367135 A1 Nov. 19, 2020

Related U.S. Application Data

(63) Continuation of application No. 16/069,887, filed as application No. PCT/US2017/013527 on Jan. 13, 2017, now Pat. No. 10,708,842.

(60) Provisional application No. 62/277,979, filed on Jan. 13, 2016.

(51) Int. Cl.
*H04W 40/12* (2009.01)
*H04W 52/02* (2009.01)
*H04W 56/00* (2009.01)
*H04W 40/24* (2009.01)

(52) U.S. Cl.
CPC .......... *H04W 40/12* (2013.01); *H04W 40/24* (2013.01); *H04W 52/0216* (2013.01); *H04W 52/0229* (2013.01); *H04W 56/00* (2013.01); *Y02D 30/70* (2020.08)

(58) Field of Classification Search
CPC . H04W 52/0229; H04W 40/24; H04W 40/12; H04W 56/00; H04W 52/0216
See application file for complete search history.

(56) References Cited

U.S. PATENT DOCUMENTS

| | | | | |
|---|---|---|---|---|
| 9,913,216 B1* | 3/2018 | Deshpande | ........... | H04W 28/14 |
| 2014/0355582 A1* | 12/2014 | Kamath | ............... | H05K 999/99 |
| | | | | 370/338 |
| 2015/0245296 A1* | 8/2015 | Tyson | ............... | H04W 52/0251 |
| | | | | 370/311 |
| 2016/0007136 A1* | 1/2016 | Chen | ....................... | H04W 4/21 |
| | | | | 370/311 |
| 2016/0095064 A1* | 3/2016 | Li | ........................... | H04W 4/06 |
| | | | | 370/311 |
| 2016/0127996 A1* | 5/2016 | Patil | ...................... | H04W 48/16 |
| | | | | 370/311 |
| 2017/0180917 A1* | 6/2017 | Steiner | .................. | G01S 13/765 |
| 2017/0181125 A1* | 6/2017 | Wiser | ................ | H04W 52/0216 |

* cited by examiner

*Primary Examiner* — Syed Ali

(57) ABSTRACT

A wireless communications system which provides improved power consumption and fast synchronization for low power and small footprint wireless devices is described. System and methods are described to provide a fast synchronization, low latency and efficient communications capability for services that sip data. That is services that exchange small amounts of data on an infrequent or sporadic basis, or data that is communicated in bursts with relatively large periods of inactivity in between.

20 Claims, 3 Drawing Sheets

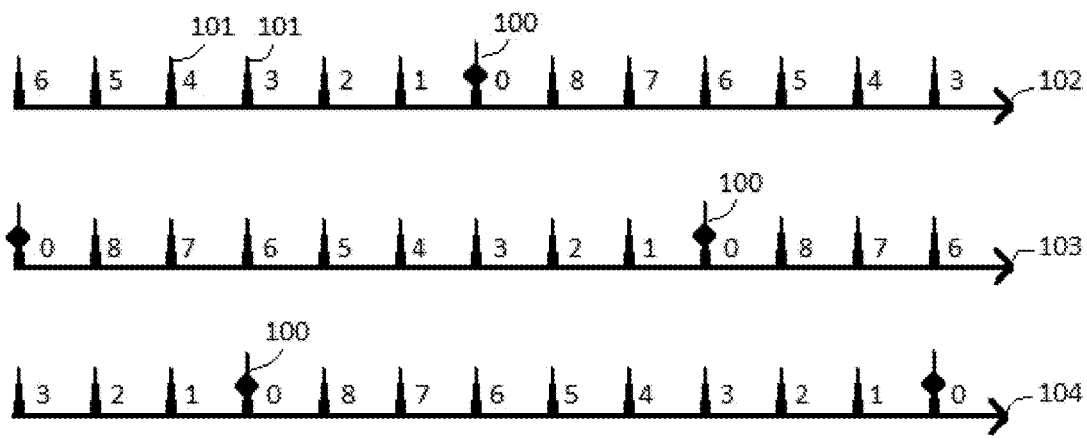
Figure 1: BLE Advertising: Non-connectable and Event Adverts Timing
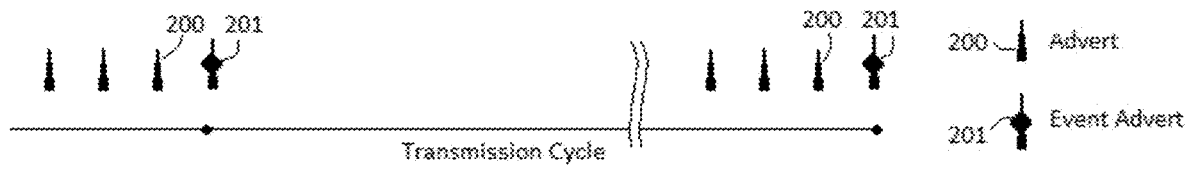
Figure 2: Event Advert with Long Period of Dormancy
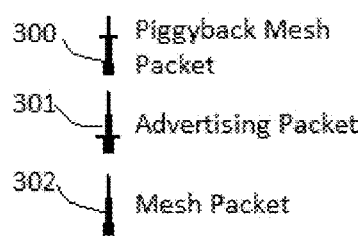
Figure 3: Key to Type of Advert Packet

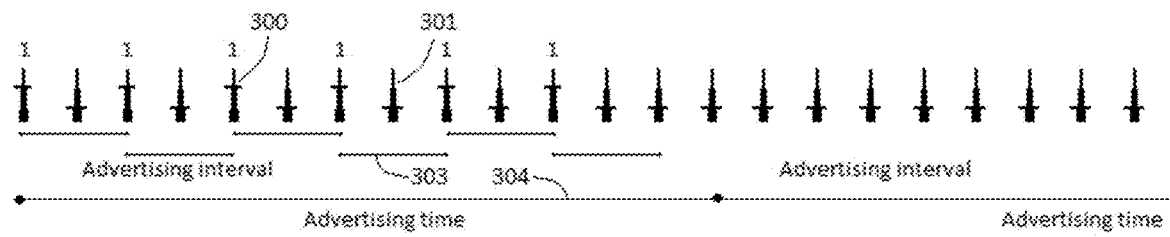
Figure 4: PIGGYBACK MODE: Single Advert Mesh Payload
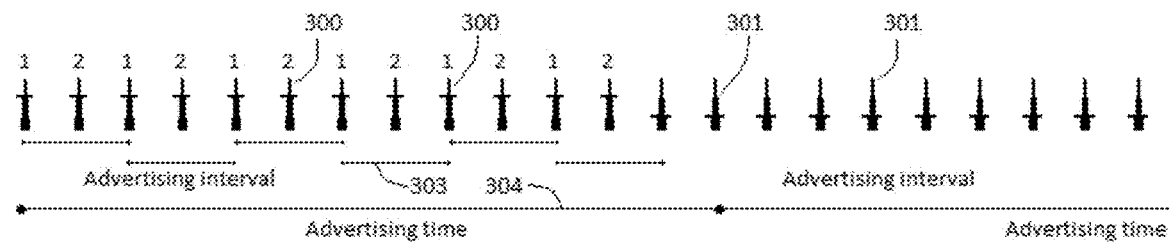
Figure 5: PIGGYBACK MODE: Two Advert Mesh Payload
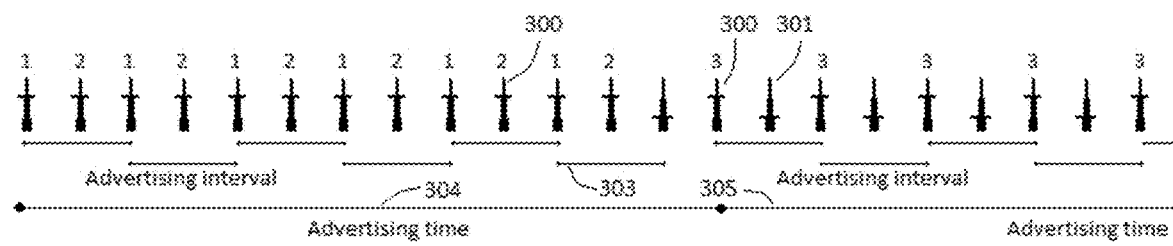
Figure 6: PIGGYBACK MODE: Three Advert Mesh Payload
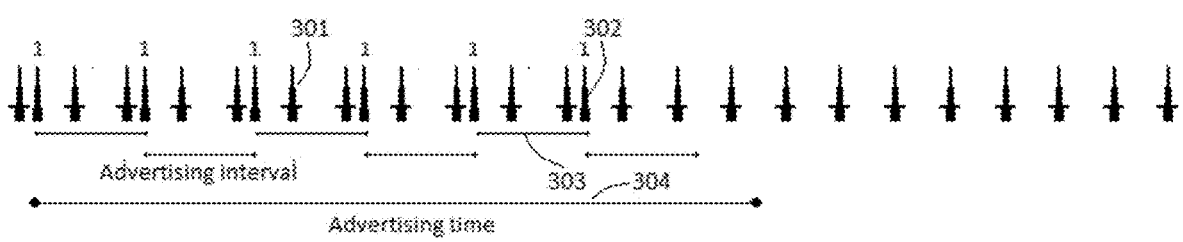
Figure 7: Mesh Adverts for MESH ADVERT MODE

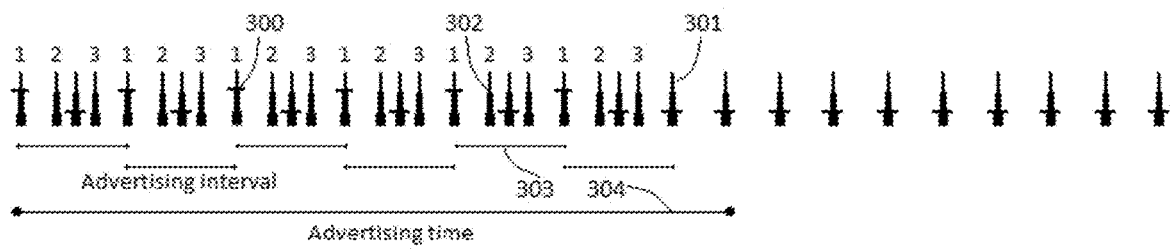
Figure 8: Mesh Adverts for MIXED ADVERT MODE
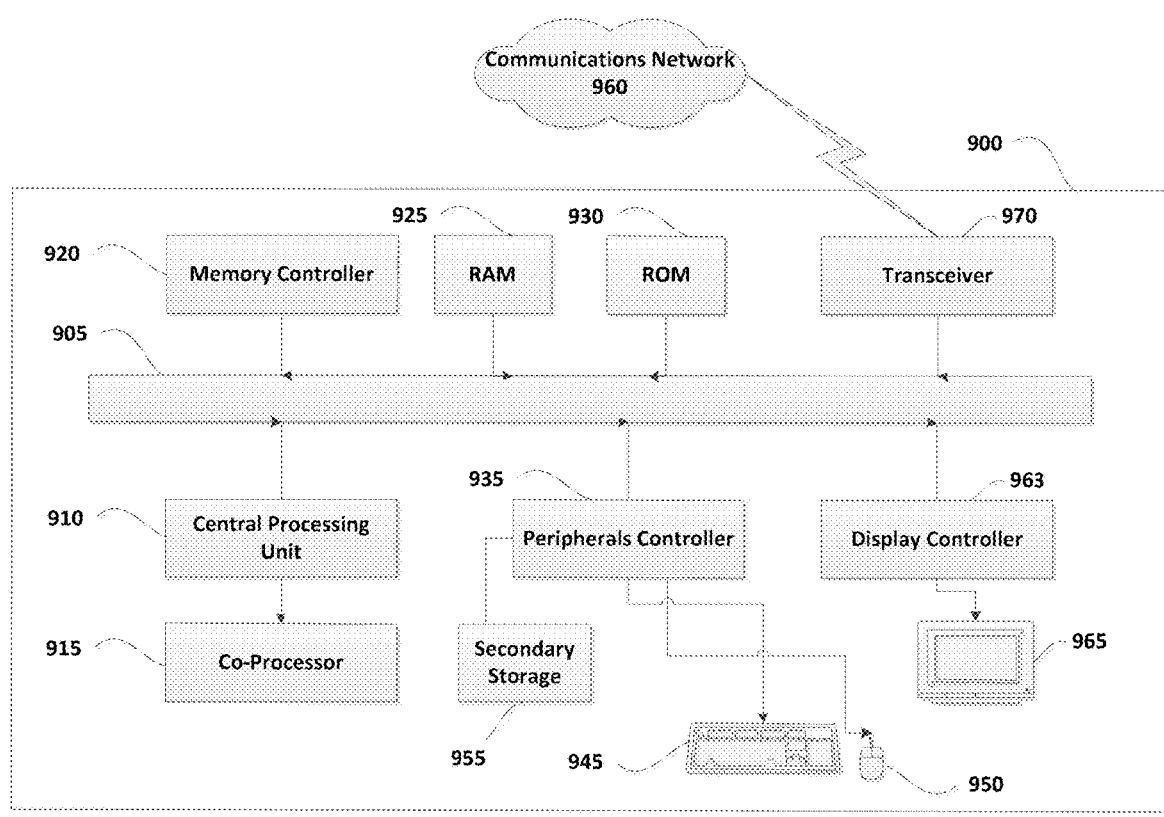
Figure 9: Exemplary Computing System

LOW POWER COMMUNICATIONS SYSTEM

CROSS-REFERENCE TO RELATED APPLICATIONS

This application claims the benefit of U.S. provisional patent application No. 62/277,979, filed Jan. 13, 2016, titled "Low Power Communications System," and the disclosure of which is hereby incorporated by reference as if set forth herein in its entirety.

BACKGROUND

With the tremendous growth of the Internet and the availability of volumes of information on an on-demand basis, there has been a growth in the diversity and breadth of services and information available to consumers and correspondingly a growth in what is referred to as the Internet of Things (IoT). In order to provide these services and data, in a tailored fashion and in a manner which is transparent, non-intrusive or demanding on the user (a person or entity consuming a service or data), in terms of steps or actions they may have to take to access the service, everything a user has or interacts with is becoming connected with "things" (devices) and various wireless standards have been developed to provide the connectivity.

Due to the small footprint and extreme low power requirements for many of these IoT devices, there is a pressing need to optimize the power consumption of these devices yet still provide a reliable, low latency and efficient communications capability for services that sip data. That is services that exchange small amounts of data on an infrequent or sporadic basis, or data that is communicated in bursts with relatively large periods of inactivity in between. The ability to operate the IoT devices with battery power and with requirements that call for a long battery life poses a challenge for the wireless communications system.

SUMMARY

Described herewith are methods for operating a wireless communication system in an extremely frugal manner with regards to power consumption. Accurate system timing through accurate clock synchronization between communicating devices can help achieve extremely low power consumption. By avoiding the need to perform scanning to achieve mutual system synchronization, power consumption may be reduced significantly. However, due to the conflicting requirement for low power consumption and low cost for these IoT devices, it is prohibitive to utilize a high accuracy clock source to maintain accurate system timing. During periods of inactive communications and deep sleep when power consumption can be minimized, the clock timing may drift between two communicating devices. The mutual timing drift leads to a need to re-synchronize the systems on a frequent basis, which leads to increased power consumption.

The wireless communications system and methods described herein aim to optimize performance and battery life for IoT devices communicating with each other with small amounts of data. In order to illustrate the system and methods, without restricting or limiting the use, the implementation of a communications and synchronization capability for a low power two-way communications system is described and illustrated herein.

A wireless device (WD) may be configured to transmit radio packets carrying information, which may include an identity of the WD, an indication that WD will not listen for an incoming message after transmitting a radio packet, timing information for the transmission of the radio packets and timing information for the transmission of an alternate radio packet form. The alternate radio packet form may carry information, which may include an identity of the WD and whether the radio of the WD will be turned on to listen for incoming messages from another listening wireless device (LWD). One or more radio packets and one or more alternate radio packets may be transmitted by the WD in a transmit sequence. For example, transmit sequence may comprise a sequence of one or more radio packets followed by a sequence of one or more alternate radio packets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the Detailed Description given below, by way of example, in conjunction with the accompanying drawings. In the drawings:

FIG. 1 shows how a combination of non-connectable adverts and event adverts with sequence numbering, which enables identification of the event beacons to optimize discovery, synchronization, latency, two-way communications, and power consumption.

FIG. 2 is an illustration showing how an event advert with long periods of dormancy may be configured with discovery non-connectable adverts to achieve very low power consumption.

FIG. 3 is a diagram showing the different type of advert packets to help illustrate the timing diagrams in the figures that follow.

FIG. 4 is a diagram showing how mesh data enough for a single advert may be piggybacked onto the spare capacity of a user advert thus creating a mesh advert based on Advertising Interval and Advertising Time settings.

FIG. 5 is a diagram showing how mesh data enough for two adverts may be piggybacked onto the spare capacity for two user adverts thus creating two mesh adverts based on Advertising Interval and Advertising Time settings.

FIG. 6 is a diagram showing how mesh data enough for three adverts may be piggybacked onto the spare capacity of three user adverts thus creating three mesh adverts based on Advertising Interval and Advertising Time settings.

FIG. 7 is a diagram illustrating how mesh data may be transmitted as a mesh advert data stream, in a separate data stream from the user adverts, based on Advertising Interval and Advertising Time settings.

FIG. 8 is a diagram illustrating how mesh data may be transmitted a mixed piggyback data stream and a mesh advert data stream based on Advertising Interval and Advertising Time settings.

FIG. 9 is a block diagram of an exemplary computing system in which aspects of the system and methods described herein may be implemented or embodied.

DETAILED DESCRIPTION

The system and methods described herein provide a means of establishing two-way communications between two or more wireless enabled devices in a manner which consumes very low power.

A wireless device (WD) may be configured to transmit radio packets carrying information, which may include an identity of the WD, an indication that WD will not listen for an incoming message after transmitting a radio packet, timing information for the transmission of the radio packets and timing information for the transmission of an alternate radio packet form. The alternate radio packet form may carry information, which may include an identity of the WD and whether the radio of the WD will be turned on to listen for incoming messages from another listening wireless device (LWD). One or more radio packets and one or more alternate radio packets may be transmitted by the WD in a transmit sequence. For example, transmit sequence may comprise a sequence of one or more radio packets followed by a sequence of one or more alternate radio packets.

The radio transmitter of the WD may be used purely in a transmit only mode and the radio receiver may be left off to conserve power. The radio receiver may be turned on immediately after transmitting an alternate packet form so that an LWD, which has ascertained timing of the radio packets from the WD may communicate with the WD. Overall the time periods when the radio receiver and transmitter of the WD are turned on is minimized to conserve battery power.

As an illustrative example, a suggested implementation of a wireless radio system designed to consume very low power using BLE radio transceivers is described hereinafter. While reference is made to a BLE wireless communications system, this is to illustrate the system operation and the concepts may be applied to other wireless systems such as ZigBee and Z-Wave.

BLE has a way of operating in a very low power mode of operation where advertising beacon signals (generically referred to as adverts) may be periodically broadcast, consuming very little power. For example, it is possible to transmit beacon signals at a rate of once per second, powered with a coin cell battery which may last more than a year. Non-connectable BLE adverts which only transmit information and do not receive information are used to accomplish this feature. This mode of operation is also known as beacon mode. In order to conserve power, the radio only transmits adverts (packets of information) and the adverts are not connectable. The radio receiver is not turned on to listen to or receive a communication from another wireless device. A non-connectable advert is broadcast over up to three pre-designated advertising channels.

In recent times, BLE beacons have become widely used to provide location specific advertising and context relevant information to consumers, requiring the beacons to transmit adverts on a continuous basis to aid location sensing and navigation applications. Beacons achieve the power consumption requirements for the emerging IoT applications but operation in a purely transmit only mode would not be practical for IoT applications. It is also desirable to dynamically perform two-way communications to for example, exchange small amounts of data for applications which sip data, support networking applications, re-configure the information transmitted by the BLE adverts, perform a remote software update or to act as a relay in a mesh network.

Methods have been devised to utilize a secondary communications mechanism such as near-field communications (NFC) or light-wave communications to facilitate two-way communications. Other methods configure the firmware to perform two-way communications by detecting the press of a button on the BLE beacon device to change mode of operation. Yet other methods configure the firmware so that upon a power on condition, the device performs two-way communications before being put into a normal transmit only beacon function. Removal of the power to the beacon device by for example, removing the battery and restoring power forces the beacon device to restart and perform two-way communications. These methods can be considered static and do not offer the features desired for dynamic two-way communications for the IoT.

In order to receive communications from other BLE devices, typical BLE radios sniff at the beacon advertising frequencies rather than continuously listen in order to conserve power, leading to long discovery and synchronization times. Even sniffing at the radio signal can consume significantly more power than just transmitting adverts.

An alternative is to transmit connectable adverts or beacons, which can receive for a short period of time after each advert is transmitted. A BLE device which wishes to communicate may then synchronize with the transmitted adverts and send a message during the receive period. This achieves better power consumption than sniffing for incoming communications. However, turning on the receiver every beacon advert broadcast would still drain battery power significantly more than using non-connectable adverts or beacons.

Power consumption and performance in terms of synchronization time and latency are key metrics for two-way communications for applications such as network communications, IoT, mesh connectivity and remotely managed beacons. The beacon transmission rate has a direct relationship to the synchronization time and power consumption. A high beacon transmission rate leads to quicker discovery and synchronization times but also an increase in power consumption. To gain performance, it's not always feasible to operate at a high beacon transmission rate. Reducing the transmission rate of the beacons, in order to reduce overall power consumption, would make the system sluggish, slow to synchronize to and impact overall applications performance. A more desirable approach is to control and balance power consumption and responsivity by turning on the receiver periodically, for two-way communications, but at a lower rate than the advertising beacon transmission rate. The two-way communications feature may be used for synchronization, control and other broadcast information.

FIG. 1 shows a diagram of a system where the three main advertising channels of BLE are configured to transmit adverts at a regular transmission rate. In this embodiment, the advertising channel streams 102, 103 and 104 are configured to transmit non-connectable adverts in order to conserve power. In the illustration, every 9th advert, 100 is configured as an event advert. The event advert may provide similar information to a non-connectable advert and it may be configured to relay additional information and/or it may be configured as a connectable advert. When configured as a connectable advert, the event advert may be capable of transmitting and also receiving and listening to incoming transmissions from other radios such as those which may detect the adverts. This form of event advert may also be referred to as a listening advert. In order to assist a receiving radio, which may be listening to adverts, to identify the timing for the event advert, each advert, for example advert 101 or event advert 100, is encoded with a decrementing sequence number as illustrated in FIG. 1. A sequence number counter is initially set to the number of non-connectable adverts to be transmitted between connectable adverts. Adverts are then transmitted and the sequence number counter decrements with every advert transmission. After the sequence number counter reaches zero, an event advert is transmitted and the sequence number counter is re-initialized to the number of non-connectable adverts to be transmitted between connectable adverts.

The term beacon may be used interchangeable with the generic term advert and the term advert may be used to refer to a non-connectable advert or a connectable advert. In order to describe the operation of the system, a device transmitting adverts is referred to as a Transmit Wireless Device (TWD) and a device receiving the transmissions from the TWD, synchronizing to the transmit timing and responding to the transmitted adverts with messages is referred to as a Receive Wireless Device (RWD). This is not intended to limit the functionality of a wireless device which may be configured to perform any one or combination of the described operations.

An RWD wishing to communicate with a TWD transmitting adverts may rapidly discover and synchronize with the adverts and extract the sequence number and other information. The sequence number then enables the RWD to sleep up to the point of the next event advert time, thus achieving rapid synchronization and conserving power. In an alternative embodiment, the sequence number scheme may vary from a cycling modulo counter decrementing or incrementing with a similar counting scheme to achieve a similar synchronization capability. In yet another embodiment, the sequence number counter may be replaced with a time value which provides information on the time difference between the transmission time of the current advert and the intended transmission time for the event advert.

In another alternative embodiment, the event advert may be staggered between the advertising channels, as shown in FIG. 1, providing an opportunity for an RWD to communicate back to the TWD faster than would be possible if the event advert timing phase was the same across all advertising channels. An RWD may ascertain the base timing information from one channel and then hop across to a different channel for the event advert if it's going to occur earlier than any of the other channels.

The data broadcast in an advert may be minimal, to conserve power by keeping the transmission burst length short, such as broadcasting enough information to identify the timing for the event advert, such as only an identity for the TWD, sequence number counter value and the time interval between adverts. The adverts may also be configured with a standardized and widely recognized UUID identifier to reduce the number of data bytes required in the transmit payload. A standardized UUID field reduces the UUID identifier field from 16 bytes to 2 bytes. The UUID field of an advert also aids reduction of power consumption for an RWD listening to the adverts by avoiding service filtering of multiple adverts, which may be received by an RWD, and identification of the low power service adverts described herein.

The advert information may be expanded during the event advert transmission to help conserve overall power consumption. Additional information elements, beyond those included in the non-connectable adverts, which may be communicated in the non-connectable adverts or event adverts include the advert transmission rate or time interval between adverts, whether the advert has an ability to listen after an advert transmission, and a random timing delay to be superimposed on the transmit timing for the next advert to be transmitted. Additionally, the information may include timing for the event adverts such as the number of event adverts to be transmitted in a sequence, the time interval between event adverts, the relative occurrence, or time interval, of the event adverts relative to the non-connectable adverts and other information elements. These parameters allow adaptation of the system operation over a wide range of operating conditions and applications whilst remaining responsive and conserving power.

In yet another embodiment where data may be communicated infrequently relative to the advert transmission rate. For example, when controlling an actuator in a building management system, power consumption may be further reduced as illustrated in the example of FIG. 2. Three non-connectable adverts, 200 may precede an event advert, 201 in order to facilitate communication of a command to an actuator. Once an actuator has been commanded with an operation, there may not be a need to command the actuator again for a while since the system design may call for a hysteresis or quiet time period. The quiet time period may be significantly longer than a typical advert time interval. After the event advert, a TWD may suspend advert transmissions until the next cycle of adverts.

BLE radios may use low cost, power and accuracy clock sources, which make maintaining tight radio synchronization difficult to maintain on a sustained basis. Scanning can be inefficient especially in a scenario where the timing between BLE device transmissions is unknown and the BLE device power consumption may significantly increase. Hence the preamble sequence of adverts ahead of the event advert aid in helping an RWD synchronize to the adverts and prepare to receive the event advert. A previous synchronization with the a TWD event advert would enable determination of the nominal timing to expect the next event advert from the transmitting device.

The event advert may be configured as a connectable or a non-connectable advert and may have many utilities and convey many information types including:

1) Advert transmission rate or time interval between adverts, whether the advert has an ability to listen, the relative occurrence of the event adverts relative to the non-connectable adverts, and the clock drift for the TWD.

2) Intent to change the phase of the adverts by advancing or retarding the advert timing from the current state. The timing may be changed by a fine or coarse amount.

3) Intent to change the time interval between adverts. The time interval may be increased or decreased.

4) Intent to change the number of non-connectable adverts between event adverts. The latency of communications with an event advert is thus affected by the increasing or decreasing the number of non-connectable adverts.

5) Indication of transition to a connected mode of operation and the timing thereof and indicating that there may be a future absence of adverts on the current advert channels.

6) Indication that the event advert is a connectable advert, enabling an RWD receiving the adverts to communicate back to the device. This may be a scan response message.

7) Indication of a protocol layer message mesh such as for example, a mesh packet or message, a new mesh message start time, a mesh control notification field or parameter, commencement of advert timing or repetition of a mesh message.

8) Indication about a future event and its characteristics such as the time when such an action will occur. For example, changing the timing of adverts may occur at a specific scheduled time after the current event advert has been transmitted.

9) Indicate an intent to launch into a mode of conversation with connectable adverts so as to facilitate a one-way or two-way, point-to-point, mesh, broadcast or group communication.

10) Information to inform about other data channels, other than the advertising channels being used for the adverts, where additional information may be found. For example, there may be a need to communicate additional information beyond the capacity of adverts to facilitate faster communications.

11) When it is required to communicate with a higher data rate, for a short period of time, the rate of the adverts may be increased or the number of non-connectable adverts between connectable adverts may be reduced.

12) Information to inform that the adverts that follow the event advert will incorporate additional information to aid efficient communications beyond that described herein. For example, whilst the non-connectable adverts may not necessarily carry additional information, there may be periods of time when these are required to carry additional information elements to facilitate faster communications.

RWDs may maintain a database of adjacent BLE devices and their timing. As the adverts from these devices are monitored, the timing may be updated in the database. Use of this timing information may help to synchronize and optimize the scanning of adverts by minimizing the scan search window. Beyond opening up a search window to scan for adverts, the RWD may be specifically turned on just ahead of the time when an advert is expected from a TWD and turned off after the advert has been received. Power is conserved by not turning on the RWD receiver during times when an advert is not expected to be present. This also helps conserve power by scanning for only adverts which are of interest to the RWD and avoids the need to filter unwanted adverts by way of for example UUID identifier filtering.

In another embodiment, the connectable adverts may be efficiently used for one or two-way communications and fast scan-response processing. A slave BLE device may obtain the advert timing of a master BLE device and its connectable advert. The slave device may transmit an advert during the time just after a connectable advert from a master device has been transmitted. During this time, the connectable advert of the master device may scan for incoming transmissions and capture the slave device's advert. After processing the advert, the master device may send a response back to the slave device indicating that the advert payload has been successfully received or other information.

In yet another embodiment, the slave device may indicate to the master device that it wishes to conduct data transmissions, possibly in a mesh mode, and to request that the master device switch it's mode of operation into connectable adverts. The slave device may synchronize its advert timing to coincide with that of the master device's connectable advert scanning. Small data packets may be transmitted by the slave device in adverts that coincide with the scan response timing of the master device's connectable adverts.

Enhancements to a basic wireless communications system include overlaying a mesh capability. A mesh capability enables data to be communicated between two nodes not within listening range of each other by soliciting the help of intermediate nodes, acting as relays, in a mesh configuration. A flood type of mesh technique broadcasts messages which are then picked up by other devices within listening range and then re-broadcast or relayed onward towards other nodes in a mesh like fashion. One particular form of BLE mesh capability operates using advertisements on the three BLE advertising channels in broadcast and observer mode. In BLE a one to one data connection between two BLE devices, known as a bridge connection, is of the central/peripheral type and uses the 37 BLE data channels.

Any of the methods described earlier for conserving power and balancing power and performance may be used in a mesh network. The mesh network may comprise three types of device operation: a transmit device, a receive device and a relay device. A device may be configured to perform any one or combination of these types of operation. Each of these type of device functionalities may be optimized with the features described earlier for performance and power conservation.

The following descriptions provide an illustration of operation and some of the redundancies involved in data communications including mesh networking. These systems may be augmented with the power saving and performance enhancing methods described herein. Alternative embodiments are feasible and the descriptions are not exhaustive.

Let's assume a mesh network is formed by a control device (central) with many mesh enabled BLE devices. All the BLE devices are associated to the control device. The control device will connect to a bridge device in its range to exchange messages with devices in the mesh network.

Take the case where a control device (central) sends a message to a certain destination device (DD) in the mesh network. DD is not in range, so a nearby device which is in range, helper device (HD), first receives the message. It sees that it is to be relayed and broadcasts it. The relay process continues until the message reaches device DD. HD receives it (in observer mode) and acts according to the information in the message. Messages not recognized by any other HD (if the associated model is not initialized) are treated as raw messages.

Transmission of mesh data from one device to another device may be achieved in a variety of ways. The set of parameters to configure and control the adverts are: Advertising Interval, Advertising Time, and Relay Repeat Count.

The Advertising Interval is the time to wait before a copy of a mesh Advert is retransmitted. That is a transmitter shall not repeat a copy of a mesh advert for at least Advertising Interval time after transmitting a mesh advert. In the illustrative examples that follow, the Advertising Interval is 100 ms.

The Advertising Time is the time period over which mesh adverts are transmitted. This is the time period over which a sequence of mesh messages and their retransmission is carried out. That is a transmitter will stop retransmission of a mesh message after an Advertising Time interval after the first occurrence of a mesh message. In the illustrative examples that follow, the Advertising Time is 1300 ms.

The Relay Repeat Count is the number of times that a mesh message is retransmitted or repeated. In the illustrative examples that follow, the Relay Repeat Count is 6.

Illustrated here are three types of means for the transportation of mesh packets at the radio level which we describe below as PIGGYBACK, MESH ADVERT or MIXED ADVERT MODE. While these are illustrative examples of the concepts, other variations are possible and the parameters may be changed or adapted. To illustrate the operation, assume for the following scenarios that for a user application, the BLE node transmits non-connectable adverts at a regular interval of 100 ms. Also assume that the mesh Advertising Interval is set to 200 ms and Advertising Time is set to 1300 ms. Note that the advert packets are of a variable length format and may have some spare capacity especially when a minimal advert data payload is used.

FIG. 3 shows a key to the adverts illustrated in the descriptions that follow. Advert type 300 are adverts where mesh data is inserted into the spare capacity of a user advert. Advert type 301 are adverts are user adverts without any mesh data. Advert type 302 are adverts that exclusively carry mesh data.

Mesh data may be queued up at the protocol layer and streamlined into a data stream of data bytes. The data stream is broken up into variable length data byte packets, which may be carried over any spare capacity on a BLE packet such as a user advert or a dedicated mesh advert. A receiver collects the payloads from the received adverts, reassembles the data stream and then reconstitutes the mesh message(s).

FIG. 4 shows an illustration for a PIGGYBACK MODE of transmission where the mesh data piggybacks on top of user adverts. The timing of adverts is as per the user application configuration of adverts and this is unaffected by the mesh protocol. The mesh data is inserted into any spare capacity of a user advert closest to the Advertising Interval, 303 and Advertising Time, 304 settings. The spare capacity of an advert is used by the mesh protocol to facilitate mesh data communications by including the mesh data into an advert packet as an additional payload element, expanding the size of the advert to as much as the maximum advert size.

A single mesh packet, 300 is pending to send and it fits within the spare capacity of an advert payload. The mesh data is sent once every other advertising packet, 301 (to achieve the 200 ms Advertising Interval, 303) and repeated 6 times (to fill the 1300 ms Advertising Time, 304). The mesh data is piggybacked onto the nearest advert based on the Advertising Interval, 303 and Advertising Time, 304 settings as shown in the FIG. 4.

FIG. 5 illustrates transmission of mesh data which fits within two adverts. There is mesh data pending to send and it fits within the spare capacity of two advert payloads. The mesh data is sent over two consecutive adverts, 300 (to achieve the transmission of each packet in the 100 ms Advertising Interval, 303) and repeated 6 times (to fill the 1300 ms Advertising Time, 304) as shown in the FIG. 5. All advert packets are used for the mesh data transmission up to the end of the repeat period. Thereafter, the mesh data buffer has been transmitted and the system reverts to user adverts, 301.

FIG. 6 illustrates transmission of mesh data which fits within three adverts. The mesh data pending to send are scheduled based on best efforts delivery. Since there are only two user adverts, 301 over an Advertising Interval, 303 the maximum amount of mesh data is inserted into the two mesh adverts, 300 during an Advertising Time, 304 and then on the next Advertising Time, 305 the remaining mesh data is inserted as illustrated in FIG. 6. This process may continue until all mesh data is transmitted.

FIG. 7 illustrates a MESH ADVERT MODE where mesh data may be transmitted in a mesh advert data stream separate from a user advert data stream. The mesh protocol generates its own adverts, 302 which it controls independently of the user adverts, 301. There is mesh data pending to send and it fits within the spare capacity of a mesh advert payload. The transmission of user adverts occurs at a regular time interval of 100 ms and the mesh data is inserted into a mesh advert and transmitted after the user advert at the start of each Advertising Interval, 303 every other user advert. The timing of mesh adverts is as per the Advertising Interval, 303 of 200 ms and Advertising Time, 304 settings as shown in FIG. 7.

FIG. 8 illustrates a MIXED ADVERT MODE where transmission of mesh data held in a buffer is exhaustively sent over an Advertising Time interval, 304 by inserting mesh data into mesh exclusive adverts and also in the spare capacity of user adverts, which coincide with the timing for the mesh adverts. Mesh adverts, 302 occur at a faster time interval of 66 ms (200 ms/3=66 ms) than the examples of FIGS. 4 to 7. The user adverts time interval is 100 ms and aligned with the mesh adverts. The mesh protocol operates as per the previously described PIGGYBACK MODE inserting mesh data into user adverts and superimposes a MESH ADVERT MODE with mesh data exclusive adverts in between the user adverts based on the Advertising Interval, 303 and Advertising Time, 304 settings. The timing of the two independent data streams are such that they have common data packets which overlap. The overlapping user adverts carry mesh data. In this case, three adverts every Advertising Interval, 303 transmit the mesh buffer data over two mesh data exclusive adverts scheduled at 66 ms intervals (200 ms/3=66 ms) and one user advert scheduled every 200 ms as shown in the trace of FIG. 3.

FIG. 9 is a block diagram of an exemplary computing system that may be used to implement the low power communications methods described above. Computing system 900 is controlled primarily by computer readable instructions, which may be in the form of software, wherever, or by whatever means such software is stored or accessed. Such computer readable instructions may be executed by a central processing unit (CPU) 910 to cause computing system 900 to do work, such as performing the occupancy detection and/or climate control methods described above. The central processing unit 910 may comprise a single processor, such as a microprocessor. In other embodiments, the central processing unit 910 may comprise multiple processors. Coprocessor 915 is an optional processor, distinct from main CPU 910, that may perform additional functions or assist CPU 910.

In operation, CPU 910 fetches, decodes, and executes instructions, and transfers information to and from other resources via the computer's main data-transfer path, system bus 905. Such a system bus connects the components in computing system 900 and defines the medium for data exchange. System bus 905 typically includes data lines for sending data, address lines for sending addresses, and control lines for sending interrupts and for operating the system bus. An example of such a system bus 905 is the PCI (Peripheral Component Interconnect) bus.

Memory devices coupled to system bus 905 include random access memory (RAM) 925 and read only memory (ROM) 930. Such memories include circuitry that allows information to be stored and retrieved. ROMs 930 generally contain stored data that cannot easily be modified. Data stored in RAM 925 can be read or changed by CPU 910 or other hardware devices. Access to RAM 925 and/or ROM 930 may be controlled by memory controller 920. Memory controller 920 may provide an address translation function that translates virtual addresses into physical addresses as instructions are executed. Memory controller 920 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 900 may contain peripherals controller 935 responsible for communicating instructions from CPU 910 to peripherals, such as, keyboard 945, mouse 950, and secondary memory storage 955, which may comprise a disk drive or the like.

Display 965, which is controlled by display controller 963, is used to display visual output generated by computing system 900. Such visual output may include text, graphics, animated graphics, and video. Display 965 may be implemented with a CRT-based video display, an LCD-based flat-panel display, gas plasma-based flat-panel display, or a touch-panel. Display controller 963 includes electronic components required to generate a video signal that is sent to display 965.

Further, computing system 900 may contain transceiver 970 that may be used to connect computing system 900 to an external communications network 960. Communications network 960 may comprise any one or combination of fixed-wire local area networks (LANs), wireless LANs, fixed wire wide-area-networks (WANs), wireless WANs, fixed wire extranets, wireless extranets, fixed-wire intranets, wireless intranets, fixed wire and wireless peer-to-peer networks, fixed wire and wireless virtual private networks, the Internet, and the wireless Internet. As mentioned above, the communications network 960 and transceiver 970 may operate in accordance with any one or more of a variety of different communication protocols, such as Bluetooth, Bluetooth Low Energy (BLE), Z-Wave, ZigBee, WiFi (802.xx), cellular (GSM, GPRS, Edge, WCDMA, CDMA or LTE) or other suitable radio technology.

It is understood that any or all of the systems, methods and processes described herein may be embodied in the form of computer executable instructions (i.e., program code) stored on a computer-readable storage medium or memory which instructions, when executed by a processor (such as a processor of a computing system), perform and/or implement the systems, methods and processes described herein. Specifically, any of the steps, operations or functions described above that are performed either at a computing system, controller, sensor, or other device may be implemented in the form of such computer executable instructions executed by a processor of the computing system, controller, sensor, or other device. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other non-transitory medium which can be used to store the desired information and which can be accessed by a computer. As used herein, the term computer-readable storage medium does not encompass a signal or other transitory medium.

Changes may be made to the above-described embodiments without departing from the broad concepts thereof. The methods and systems described herein are not limited to the particular embodiments disclosed but are intended to cover all modifications which are in the spirit and scope of the disclosed concepts as defined by the appended claims.

What is claimed:

1. A method being performed by a wireless communications device, the method comprising transmitting an at least one sequence of data packets wherein:
    the at least one sequence of data packets further comprises an at least one first data packet type (FDPT) followed by an at least one second data packet type (SDPT);
    a counter is initialized prior to transmitting the at least one sequence of data packets;
    the counter is incremented by one after transmitting each data packet;
    each successive data packet transmission is separated by a transmission time interval from the last transmitted data packet;
    the transmission time interval is a constant time interval plus a random timing jitter that is randomly determined for each data packet;
    the information in each of the at least one FDPT comprises an identity of the wireless communications device, the constant time interval, value of the counter, and an indication that the at least one FDPT is a non-connectable Bluetooth Low Energy (BLE) advert;
    the information in each of the at least one SDPT comprises an identity of the wireless communications device, the constant time interval, value of the counter, information inserted by a mesh scheduler, and an indication that the at least one SDPT is a non-connectable BLE advert; and
    the mesh scheduler:
        receives a stream of mesh data to transmit;
        queues a block of mesh data from the stream of mesh data to transmit;
        establishes a repeat count for transmitting the block of mesh data;
        establishes a repeat count number of consecutive mesh advertising interval time periods; and
        establishes a mesh advertising time that starts with the first mesh advertising interval time period and ends after the last mesh advertising interval time period; and
        performs for each mesh advertising interval time period:
            segmentation of the block of mesh data to be transmitted over one or more consecutive SDPT;
            insertion of a first segment of the block of mesh data in the first SDPT to be transmitted in the mesh advertising interval time period; and
            insertion of successive segments of the block of mesh data into consecutive SDPT up to the end of the mesh advertising interval time period or upon reaching the end of the block of mesh data.

2. The method as recited in claim 1 wherein the random timing jitter is zero.

3. The method as recited in claim 1 wherein the segments of the block of mesh data are inserted into the spare data fields of the SDPT BLE adverts.

4. The method as recited in claim 1 wherein the mesh scheduler inserts the mesh advertising interval time, mesh advertising time, and repeat count in an at least one of the SDPTs.

5. The method as recited in claim 1 wherein the information in the at least one SDPT comprises information to assist one or more wireless devices in a mesh network to perform relay communications.

6. The method as recited in claim 1 wherein the mesh scheduler removes the transmitted block of mesh data from the mesh queue at the end of the mesh advertising time.

7. The method as recited in claim 6 wherein the mesh scheduler repeats the steps of queuing a block of mesh data, establishing a mesh advertising interval time, a mesh advertising time, and a repeat count, inserting segments of mesh data into SDPT, and removing the transmitted block of mesh data from the mesh queue.

8. The method as recited in claim 1 wherein the at least one SDPT is a non-connectable BLE extended advert.

9. The method as recited in claim 1 wherein the format and information elements in the at least one FDPT are the same as the format and information elements in the at least one SDPT.

10. A method being performed by a wireless communications device, the method comprising transmitting an at least one sequence of data packets wherein:
the at least one sequence of data packets further comprises an at least one first data packet type (FDPT) followed by an at least one second data packet type (SDPT);
a counter is initialized prior to transmitting the at least one sequence of data packets;
the counter is incremented by one after transmitting each data packet;
each successive data packet transmission is separated by a transmission time interval from the last transmitted data packet;
the transmission time interval is a constant time interval plus a random timing jitter that is randomly determined for each data packet;
the information in each of the at least one FDPT comprises an identity of the wireless communications device, the constant time interval, value of the counter, and an indication that the at least one FDPT is a non-connectable Bluetooth Low Energy (BLE) advert;
the information in each of the at least one SDPT comprises an identity of the wireless communications device, the constant time interval, value of the counter, information inserted by a mesh scheduler, and an indication that the at least one SDPT is a connectable BLE advert; and
the mesh scheduler:
receives a stream of mesh data to transmit;
queues a block of mesh data from the stream of mesh data to transmit;
establishes a repeat count for transmitting the block of mesh data;
establishes a repeat count number of consecutive mesh advertising interval time periods; and
establishes a mesh advertising time that starts with the first mesh advertising interval time period and ends after the last mesh advertising interval time period; and
performs for each mesh advertising interval time period:
segmentation of the block of mesh data to be transmitted over one or more consecutive SDPT;
insertion of a first segment of the block of mesh data in the first SDPT to be transmitted in the mesh advertising interval time period; and
insertion of a first segment of the block of mesh data in the first SDPT to be transmitted in the mesh advertising interval time period; and
insertion of successive segments of the block of mesh data into consecutive SDPT up to the end of the mesh advertising interval time period or upon reaching the end of the block of mesh data.

11. A computing system comprising a processor and a memory, the memory storing data and computer-executable instructions that, when executed by the processor, cause the computing system to:
prepare an at least one sequence of data packets comprising an at least one first data packet type (FDPT) followed by an at least one second data packet type (SDPT) wherein:
a counter is initialized prior to preparing the at least one sequence of data packets;
the counter is incremented by one after preparing each sequential data packet;
the information in the at least one FDPT comprises an identity of the wireless communications device, a constant time interval, the value of the counter, and an indication that the at least one FDPT is a non-connectable Bluetooth Low Energy (BLE) advert; and
the information in the at least one SDPT comprises an identity of the wireless communications device, the constant time interval, the value of the counter, information inserted by a mesh scheduler, and an indication that the at least one SDPT is a non-connectable BLE advert;
execute a mesh scheduler wherein the mesh scheduler:
receives a stream of mesh data to transmit;
queues a block of mesh data from the stream of mesh data to transmit;
establishes a repeat count for transmitting the block of mesh data;
establishes a repeat count number of consecutive mesh advertising interval time periods; and
establishes a mesh advertising time that starts with the first mesh advertising interval time period and ends after the last mesh advertising interval time period; and
performs for each mesh advertising interval time period:
segmentation of the block of mesh data to be transmitted over one or more consecutive SDPT;
insertion of a first segment of the block of mesh data in the first SDPT to be transmitted in the mesh advertising interval time period; and
insertion of successive segments of the block of mesh data into consecutive SDPT up to the end of the mesh advertising interval time period or upon reaching the end of the block of mesh data; and
transmit the at least one sequence of data packets wherein:
each successive data packet is separated by a transmission time interval from the last transmitted data packet; and
the transmission time interval is the constant time interval plus a random timing jitter that is randomly determined for each data packet.

12. The computing system as recited in claim 11 wherein the random timing jitter is zero.

13. The computing system as recited in claim 11 wherein the segments of the block of mesh data are inserted into the spare data fields of the SDPT BLE adverts.

14. The computing system as recited in claim 11 wherein the mesh scheduler inserts the mesh advertising interval time, mesh advertising time, and repeat count in the FDPTs.

15. The computing system as recited in claim 11 wherein the mesh scheduler repeats the insertion and transmission of the block of mesh data for a repeat count.

16. The computing system as recited in claim 11 wherein the mesh scheduler removes the transmitted block of mesh data from the mesh queue at the end of the mesh advertising time.

17. The computing system as recited in claim 16 wherein the mesh scheduler repeats the steps of queuing a block of mesh data, establishing a mesh advertising interval time, a mesh advertising time, and a repeat count, insertion of segments of mesh data into SDPT, and removes the transmitted block of mesh data from the mesh queue at the end of the mesh advertising time.

18. The computing system as recited in claim 11 wherein the at least one SDPT is a non-connectable BLE extended advert.

19. The computing system as recited in claim 11 wherein the format and information elements in the at least one FDPT are the same as the format and information elements in the at least one SDPT.

20. The computing system as recited in claim 11, wherein the information in the at least one SDPT comprises information to assist one or more wireless devices in a mesh network to perform relay communications.

* * * * *